Patented Jan. 10, 1933

1,894,149

UNITED STATES PATENT OFFICE

FRIEDRICH BARTLING, OF HUGLFING, GERMANY

PROCESS FOR CONSERVING GRANULAR MATERIALS

No Drawing. Application filed July 14, 1930, Serial No. 467,981, and in Germany July 19, 1929.

Processes are known for the preservation of masses in granular form or in lumps which contain volatile or easily decomposable or otherwise non-stable substances, in which the granules are coated with a stable substance. Hitherto processes of this kind were carried out by providing such masses containing easily decomposable substances, such for example as chemical fertilizers, with a protective coating by immersion in pulpy or oily substances.

The subject of this invention is a new kind of process for this same purpose which presents special features of cheapness and operation and also possesses further important advantages which will be evident from the further description of the process.

Basically the new method of procedure consists in vaporizing a stable substance which is selected as a protective agent for the mass which is readily subject to deterioration, and depositing it on the outer surfaces of the granules of the mass to be protected which surfaces are maintained at a lower temperature. The particular way of applying the protective agent to the granular mass to be protected brings about the condition that the raw material from which the protective agent is obtained by vaporization may contain in addition also other constituents in considerable quantities such for example as admixtures and impurities.

In some cases it is advantageous to employ as a protective agent a substance, the vapor of which at the same time exerts a drying action on the mass to be protected.

Important advantages can also be obtained by using as protective agent substances which serve the same purpose in use as the masses to be protected, thus for example as a protective agent for a chemical fertilizer a substance may be employed which likewise possesses fertilizing properties. In this way by applying the protective agent the effectiveness of the mass to be protected is increased in the sense of the purpose in view for which the mass is to be used.

For example according to the new process the preservation of ammonium bicarbonate may be effected in an efficient manner by vaporizing ammonium chloride and depositing the vapor on the granular ammonium bicarbonate. In order to carry out this process ammonium chloride vapor may be brought into contact with cold ammonium bicarbonate crystals in a suitable apparatus in such manner that the crystals are exposed on all sides to the sublimation product. A deposition of the vapor of the ammonium chloride on the outer surfaces of the ammonium bicarbonate crystals then takes place so that the stable protective agent forms a firm covering layer around the easily decomposable ammonium bicarbonate crystals.

The important advantages of the new process are shown particularly in the application of the process to fertilizers, since in this case it is possible economically to obtain the production of suitable mixed fertilizers at the same time as the protective effect.

In the above repeated example the mixture of two kinds of fertilizer is accompanied by the additional advantage that a drying of the ammonium bicarbonate crystals is brought about by the ammonium chloride vapors. A previous drying of the ammonium bicarbonate is therefore unnecessary, so that the well known unavoidable partial decomposition which ammonium bicarbonate otherwise undergoes upon drying by heat is avoided.

Apart from the treatment of ammonium bicarbonate for example with ammonium chloride it is advantageous in many cases to carry out this treatment with urea, ammonium sulphate and the like. In all cases, however it is clearly desirable to employ the appropriate materials according to the different conditions of the fertilizing technique for effecting a common fertilizing action and at the same time to protect the easily decomposable substances.

I claim:

1. The process of preserving non-stable solid material which comprises treating the said non-stable solid material with ammonium chloride in the form of a vapor in such a manner that the said ammonium chloride is deposited on the said non-stable solid material in the form of a coating.

2. The process as set forth in claim 1, in which the non-stable material is coated while at a lower temperature than the ammonium chloride.

3. The process as set forth in claim 1 in which the non-stable solid material is in granular form and at a lower temperature than the ammonium chloride.

4. The process of preserving a non-stable fertilizer which comprises treating the said fertilizer with ammonium chloride in the form of a vapor in such a manner that the said ammonium chloride is deposited on the said fertilizer in the form of a coating.

5. The process as set forth in claim 4, in which the ammonium chloride contains impurities.

6. The process as set forth in claim 4, in which the said fertilizer is coated while at a lower temperature than the ammonium chloride.

7. As a new article of manufacture, a non-stable solid coated with ammonium chloride.

8. As a new article of manufacture a non-stable fertilizer coated with ammonium chloride.

9. As a new article of manufacture, ammonium bicarbonate coated with ammonium chloride.

10. As a new article of manufacture, ammonium bicarbonate coated with ammonium chloride containing impurities.

In testimony whereof I have affixed my signature.

FRIEDRICH BARTLING.